United States Patent [19]

Agostinelli

[11] Patent Number: 4,569,573

[45] Date of Patent: Feb. 11, 1986

[54] METHOD OF MAKING LIGHT VALVE ARRAYS HAVING TRANSVERSELY DRIVEN ELECTROOPTIC GATES

[75] Inventor: John A. Agostinelli, Rochester, N.Y.

[73] Assignee: Eastman Kodak Company, Rochester, N.Y.

[21] Appl. No.: 691,364

[22] Filed: Jan. 14, 1985

Related U.S. Application Data

[62] Division of Ser. No. 492,309, May 6, 1983, abandoned.

[51] Int. Cl.[4] .............................................. G02F 1/03
[52] U.S. Cl. .................................... 350/320; 29/572; 29/825; 29/854; 350/356
[58] Field of Search ............... 350/356, 320, 388, 392; 29/25.35, 572, 592, 825, 854

[56] References Cited

U.S. PATENT DOCUMENTS

| | | | |
|---|---|---|---|
| 3,331,651 | 7/1967 | Sterzer | 350/96 |
| 3,517,200 | 6/1970 | Kalman | 350/356 |
| 3,644,017 | 2/1972 | Ploss | 350/150 |
| 3,704,512 | 12/1972 | Siegal | 350/356 |
| 3,741,626 | 6/1973 | Wentz | 350/150 |
| 3,873,187 | 3/1975 | Brooks | 350/160 R |
| 3,904,272 | 9/1975 | Straka | 350/150 |
| 4,093,345 | 6/1978 | Logan et al. | 350/355 |
| 4,166,230 | 8/1979 | Luft | 310/365 |
| 4,229,095 | 10/1980 | Mir | 355/4 |
| 4,410,240 | 10/1983 | Medernach | 350/356 |

OTHER PUBLICATIONS

Butter et al., "Thermoplastic Holographic Recording of Binary Patterns in PLZT Line Composer", IEEE Trans. on Computers, 4-1975, pp. 402-406.

*Primary Examiner*—Carl E. Hall
*Attorney, Agent, or Firm*—Raymond L. Owens

[57] ABSTRACT

A light valve array having transversely driven electrooptic gates is disclosed, with the array having a substrate and a plurality of discretely addressable electrooptic gates mounted thereon. Each gate has two spaced parallel surfaces, one of which has an addressable electrode and the other surface is connected to a planar conductive surface on the substrate. When a potential is applied between a gate electrode and the conductive surface of the substrate, a uniform electric field is produced in such gate. The array is mounted in a notch on a circuit board such that the addressable electrodes are in electrical contact with a corresponding plurality of circuit board conductors, and the planar conductive surface is in electrical contact with another circuit board conductor. According to the disclosed method of making these arrays, a stack of plates of electrooptic material is releasably assembled and permanently attached to a stack of plates of substrate material similarly releasably assembled in a manner such that the corresponding plates are aligned edge-to-edge. The attached stacks are machined, metallized to provide the gate electrodes, and then the plates are separated to form a plurality of such transversely driven light valve arrays.

8 Claims, 5 Drawing Figures

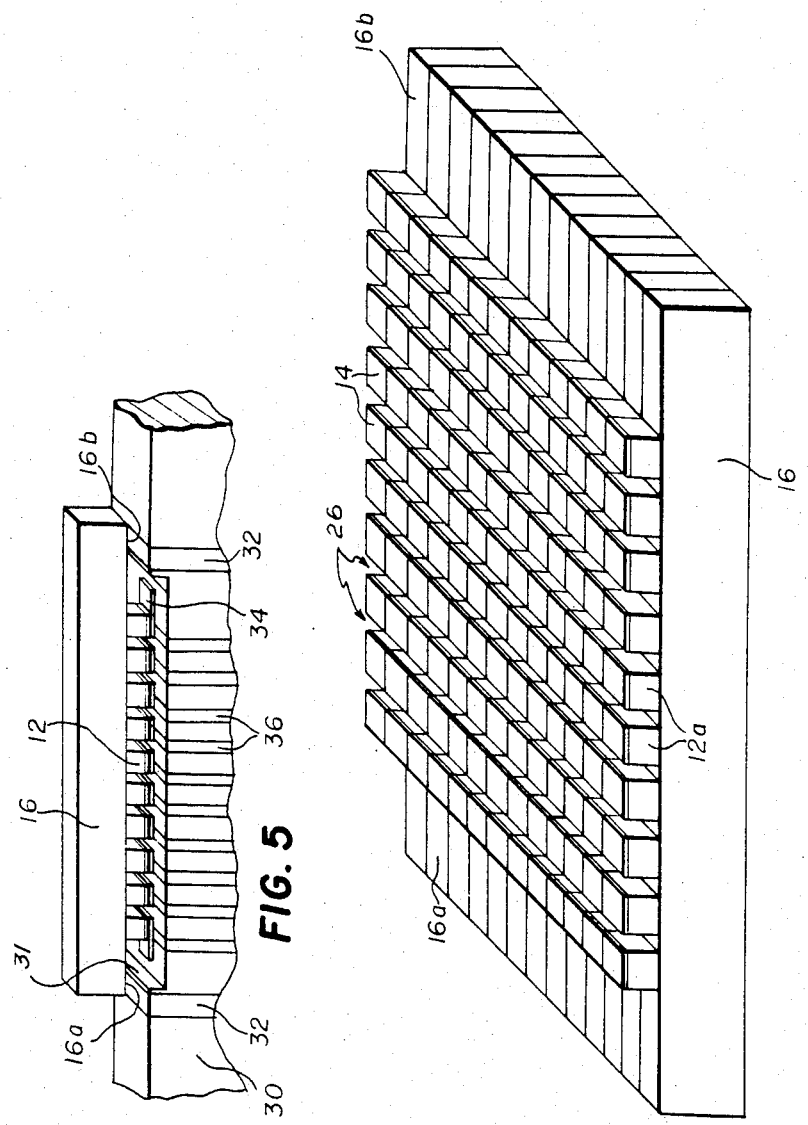

METHOD OF MAKING LIGHT VALVE ARRAYS HAVING TRANSVERSELY DRIVEN ELECTROOPTIC GATES

This is a division of application Ser. No. 492,309, filed May 6, 1983, now abandoned.

BACKGROUND OF THE INVENTION

1. Field of the Invention

The present invention relates to light valve arrays having transversely driven electrooptic gates, and to a method of simultaneously making a plurality of such arrays.

2. Description of the Prior Art

One form of light valve comprises a gate that is electrically addressable for changing the polarization of light passing therethrough, sandwiched between a polarizer and a crossed analyzer. The gate generally comprises a sheet of transparent material exhibiting an electrooptical effect, such as lanthanum doped lead zirconate titanate (PLZT), on which is provided a pair of electrodes for generating an electric field in the material to stimulate the electrooptical effect. In one such light valve array, a sheet of PLZT material has a plurality of coplanar interleaved electrodes formed on one surface of the sheet generally normal to incident plane polarized light, thereby defining a plurality of gates on the sheet. The selective application of electrical voltage signals to adjacent electrodes generates an electrical field in the PLZT material having a component generally perpendicular to the direction of incident light. The plane of polarization of this incident light is at a 45° angle with respect to the perpendicular component of the electrical field. The electric field causes the PLZT material to become birefringent, thereby changing the state of polarization of the incident light. As a result, the transmission of light through the analyzer varies as a function of the strength of the perpendicular component of the electric field in the light valve. For an example of such a light valve array having coplanar electrodes, see commonly assigned U.S. Pat. No. 4,229,095 to Mir. A difficulty with a light valve array having coplanar electrodes is that a signal applied to the coplanar electrodes is inefficient in producing components of the electric fields perpendicular to the incident light, throughout the volume of the light valve gate. Consequently, relatively high voltages are required to operate such light valve arrays. In another approach, U.S. Pat. No. 3,873,187 to Brooks, an array is provided having transversely driven electrooptic gates. Electrodes are provided on opposite parallel surfaces of each gate. The gates are formed by cutting a plurality of parallel grooves in a strip of electrooptical material, and filling the grooves with conductive material, thereby defining a row of gates. Adjacent gates share the electrode between them. Polarized light is incident on a gate surface perpendicular to the plane of the array. Since the electric field produced in the material is uniform throughout the gate volume, the gates can be operated at relatively low voltages. In making such light valves, difficulty is encountered in forming and filling the grooves, especially if the number of gates in the array is large. It is therefore an object of the present invention to provide an improved method of manufacturing light valve arrays having transversely driven electrooptic gates. Another problem with the manufacture of the prior light valve arrays is that of making electrical contact with the electrodes of the array. One known method employs the technique of stringing fine wires through the grooves prior to filling the grooves with conductive material. The wires are bonded to a circuit on which the electrooptic material is mounted. The wire bonding technique, especially for light valve arrays having a large number of gates is time consuming. A further object of the present invention therefore is to provide a light valve array with improved means for making electrical contact with the gate electrodes.

A further problem with the transversely driven light valve array described above, is that each gate electrode is shared by two adjacent gates. As a result, the scheme for addressing the light valve array is complicated. It is therefore a further object of the present invention to provide a transversely driven light valve array having an electrode structure that facilitates simplified addressing.

SUMMARY OF THE INVENTION

The above noted problems are overcome and the stated objects are achieved according to my invention by providing a light valve array having transversely driven electrooptic gates comprising a substrate having an electrically conductive surface, and a plurality of gates formed of electrooptic material, each gate having a light receiving surface and first and second spaced parallel electrode surfaces substantially normal to the light receiving surface. The first electrode surface is attached to the conductive surface of the substrate, and an addressable electrode is provided on the second electrode surface.

The resulting array is conveniently mounted in a notch on a circuit board, wherein the addressable electrodes are electrically connected to circuit board conductors on the bottom of the notch, and the conductive surface of the substrate is electrically connected to a circuit board conductor on the edge of the notch.

According to another aspect of the invention, a plurality of such light valve arrays are simultaneously produced by the steps of releasably attaching together a plurality of plates of substrate material to form a first stack, and releasably attaching together a plurality of plates of electrooptic material of the same thickness as the substrate plates to form a second stack. The two stacks are positioned so that the plates are aligned edge-to-edge and permanently joined together. The joined stacks are machined and a surface of the second plate is metalized to form addressable gate electrodes thereby providing a plurality of fastened light valve arrays. The arrays are then separated to provide a plurality of individual arrays.

According to a preferred embodiment of the invention, the plates are releasably attached with a soluable adhesive, and the stacks are fastened together with an insoluble conductive adhesive. Alternatively a selective heat releasable adhesive system can be used.

BRIEF DESCRIPTION OF THE DRAWINGS

FIGS. 2–4 show several steps in the method of making the array of FIG. 1; and

FIG. 5 shows the array of FIG. 1 assembled onto a printed circuit board.

DESCRIPTION OF THE PREFERRED EMBODIMENTS

Figure 1:
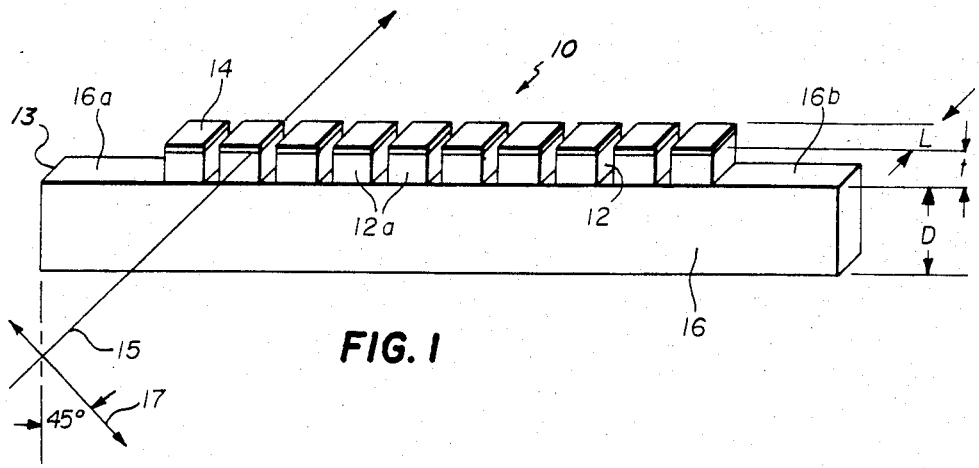
FIG. 1 is a schematic perspective view of one preferred embodiment of light valve array that can be made in accordance with the present method.

FIG. 1 shows a transversely driven light valve array 10 having electrooptic gates 12 in accordance with this invention. Metallized addressable electrodes 14 are provided on one surface of each gate and the oppositely spaced parallel surface of each gate 12 is electrically connected to a conductive planar surface 13 of substrate 16. These parallel surfaces are normal to a light receiving surface 12a. Substrate 16 defines shoulders 16a and 16b which extend beyond the gates 12 for purposes to be described below.

More particularly, each gate 12 is a rectangular parallelepiped of electrooptically active material, mounted in line on a substrate 16 having a conductive planar surface 13. Alternatively, substrate 16 may itself be comprised of a conductive material. An electric field can be applied between the substrate 16 and the gate electrode 14. The conductive planar surface 13 of the substrate acts as a common electrode for all the gates 12, whereas each electrode 14 is shared by only one gate 12, thereby making the gates discretely addressable. The electric field is applied transversely across a distance t of the gate generally perpendicular to the direction of propagation of light through the gate. The input light is propagated along an axis as shown by line 15 perpendicular to the field and to the receiving surface 12a. Light which was initially plane polarized at 45° angle (see line 17) to the direction of the electric field in the electrooptic material by a polarizer (not shown) travels a distance L through a gate 12. A conventional crossed analyzer (not shown), receives the light which passes through a gate. The plane polarized light can be resolved into two mutually perpendicular components, a vertical component, perpendicular to the direction of the applied electric field and a horizontal component parallel to the direction of the applied electric field. Since the analyzer is crossed with respect to the polarizer, when no electric field is applied, a minimum amount of light transmits through the analyzer. However, if the electric field is applied, the state of polarization changes. If the half-wave voltage is applied, the plane of polarization is rotated 90°, the maximum amount of light transmits through the analyzer. For such a transversely driven gate, the voltage which causes the maximum light transmission is termed the half-wave retardation voltage ($V_{\frac{1}{2}}$). This voltage decreases as the aspect ratio L/t increases (in a linear or nonlinear way depending on the material). We can thus make $V_{\frac{1}{2}}$ arbitrarily small by adjusting L and t wherein L is the thickness and t is the height of a gate 12. As an example consider that for the material 9065 PLZT, with L=500μ and t=100μ then $V_{\frac{1}{2}}$=40 Volts. Thus, quite practical values of L and t give rise to a half-wave voltage well within the voltage limits of standard integrated MOS technology. The voltage of maximum transmission has been termed the "half-wave voltage" because the relative retardation of the polarization components parallel and perpendicular to the applied electric field at this voltage is 180° or λ/2 for the transmitted light wavelength, causing a 90° rotation in the plane of polarization of the light by a gate 12.

Arrays according to a further aspect of the present invention are easily mounted as shown in FIG. 5. A circuit board 30 is provided with a notch 31 on one edge thereof that is substantially the same depth as the thickness t of the gates in the light valve array, and is slightly shorter than the length of the array. The array 10 is mounted in the notch 31 such that shoulder portions 16A and 16B contact the circuit board outside the notch, and the addressable electrodes 14 of gates 12 contact the bottom of the notch. The conductive surface 13 of substrate 16 is electrically connected to a circuit board conductor 32 on the circuit board, and the electrodes 14 of gates 12 are electrically connected to respective circuit board conductors 36 on the circuit board. The array 10 is attached to the conductors on the circuit board using well-known reflow soldering techniques. Alternatively, conductive elastomer pads 34 may be positioned between the electrodes and the conductors, and the array mechanically clamped against pads to provide positive electrical contact.

The following is a description of a method of simultaneously making a plurality of light valve arrays such as shown in FIG. 1.

Figure 2:
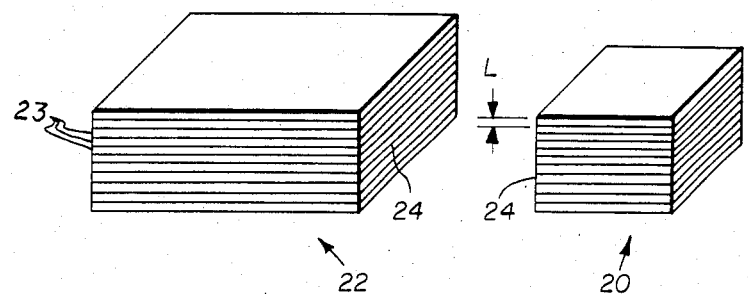

As shown in FIG. 2, thin plates 18 of electrooptic material which have been polished on each side, are assembled to form a stack 20. The plates 18 are of uniform thickness (dimension L in FIG. 1). The individual plates 18 of the stack are cemented together with an adhesive cement which may be readily dissolved in a solvent. Glycol phthalate has been used as the cement and acetone as the solvent. A second stack 22 of slightly wider plates 23 of substrate material, e.g. copper, of identical number and thickness L is similarly assembled and cemented together. The surface 24 of each stack is ground flat and perpendicular to the planes of the plates.

Figure 3:
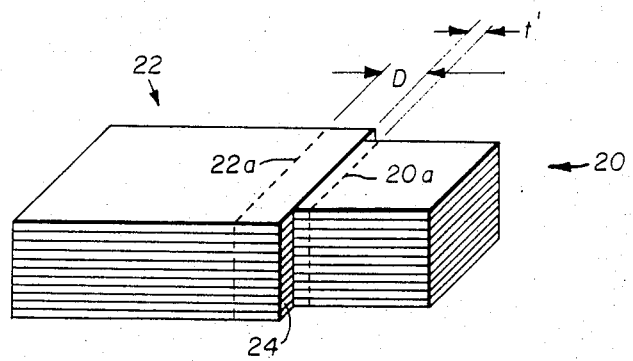

Referring to FIG. 3, the two stacks are joined in register along their ground flat surfaces 24 with a conducting cement or adhesive which is insoluble in the solvent of the adhesive that was used to cement the plates in the stacks. Alternatively, the conducting cement may be such that it does not melt or decompose at a temperature at which the cement which binds the plates in the stack melts or decomposes. The two stacks are aligned and held in a simple vise fixture for joining. The distance D is the substrate height as shown in FIG. 1, t' is chosen to be slightly greater than t in FIG. 1. The stacks are respectively cut along dotted lines 20a and 22a. The freshly sawed surface of stack 20 is ground flat and parallel to surfaces 24 until t'=t. This surface is then metallized with a thin film of conductive metal, preferably gold, copper or aluminum to provide what will become the addressable gate electrodes 14 (see FIG. 1).

The thermal properties of a light valve array substrate are often important. It may be desirable to provide a substrate with good thermal conductivity and/or with similar thermal expansion coefficient to that of the electrooptic material. If the substrate is not an electrical conductor such as copper, then surface 24 of the substrate which will engage gates 12 may be metallized (e.g., by evaporation, or sputtering, organometalic deposition or electroless plating) to provide a common electrical connection between all the gates and the substrate.

As shown in FIG. 4, evenly spaced, parallel grooves or slots 26 are now cut in the electrooptic material in a pattern perpendicular to the planes of the plates to define the individual gates for a plurality of light valve arrays. For a conducting substrate, the grooves may be cut completely through the electrooptic material into the substrate. The grooves define the gates and their respective top electrodes and also help to eliminate cross talk between electrodes due to fringing fields from adjacent electrodes, since the dielectric constant of electrooptic material is typically much greater than that of air. Alternatively, the substrate can be a non-conducting material such as a ceramic that has been coated with a metallized layer on surface 24 before joining the stacks. In this case the grooves are not cut completely through the electrooptical material into the substrate. In such a case, the metallized layer on the substrate remains intact. The various sawing and machining operations may be accomplished with a diamond dicing saw. Alternatively, the grooving may be eliminated entirely and the electrode structure may be patterned on a continuous body of electrooptic material by a masked evaporation process or photolithographic process as is well known in the art. With this configuration, care must be taken to separate the electrodes sufficiently so that cross talk between gates due to fringing fields is not objectionable.

The resulting structure as shown in FIG. 4 is a plurality of fastened light valve arrays. The structure is soaked in a solvent (acetone) which dissolves the adhesive binding the plates and the individual light valve arrays separate. Alternatively, a selective amount of heat can be applied to separate the structure into individual light valve arrays. As many light valve arrays are produced as there were plates in the original stack, and each appears as in FIG. 1. Typically, hundreds of plates give easily handled stack heights of a few inches. Moreover, the remaining stack of materials left over after the first sawing operations may be used to produce other batches of light valve arrays in accordance with the above procedure.

The process described above was successfully carried out with 20 mil 9565 PLZT wafers used as both gate and substrate plates. An electrode was evaporated on the surface 24 of the stack of substrate plates. Ten light valve arrays were fabricated simultaneously using glycol phthalate for cementing the substrate plates and a conductive epoxy cement for cementing the stack of electrooptic material to the stack of substrate plates. Acetone was used as the solvent. The most sensitive aspects of the process are the precise matching of wafer thicknesses, and the avoidance of stress birefringence introduced by fastening, cementing or machining operations. In the above example, light valve arrays were produced, which were separated cleanly and easily and showed negligible stress birefringence.

The invention has been described in detail with particular reference to certain preferred embodiments thereof, but it will be understood that variations and modifications can be effected within the spirit and scope of the invention.

What is claimed is:

1. A method of simultaneously making a plurality of light valve arrays, each having a substrate and plurality of transversely driven electrooptic gates connected to said substrate, said method comprising the steps of:
 (a) releasably attaching together a plurality of plates of substrate material together to form a first stack;
 (b) releasably attaching together a plurality of plates of electrooptic material of the same thickness as the substrate plates to form a second stack;
 (c) positioning said first and second stacks until the plates in said stacks are aligned edge-to-edge and then permanently fastening the stacks together;
 (d) machining the fastened stacks to form a structure having a cross section resembling the desired light valve array, and forming addressable electrodes on the edges of said electrooptic plates; and
 (e) releasing the plurality of plates to provide a plurality of individual light valve arrays.

2. The method of claim 1, wherein said plates are releasably attached with soluble adhesives, and said stacks are fastened together with insoluble adhesive.

3. The method of claim 1, wherein said plates are releasably attached with a selective heat releasable adhesive.

4. The method of claim 1, wherein said addressable electrodes are formed by metallizing a surface of said stack of electrooptic plates and sawing a plurality of evenly spaced, parallel grooves through said material in a direction generally perpendicular to the planes of said plates.

5. The method of claim 1, wherein said addressable electrodes are formed by forming a plurality of parallel stripes of metal across one surface of said stack of electrooptic plates.

6. In a method of simultaneously making a plurality of light valve arrays having transversely driven electrooptic gates, the improvement including the steps of:
 (a) releasably assembling (i) a plurality of plates of substrate material, and (ii) a plurality of electrooptic plates to form first and second stacks respectively;
 (b) permanently fastening the first and second stacks so that their respective plates are aligned edge-to-edge;
 (c) machining the aligned first and second stacks and metallizing a surface of the second stack to form addressable gate electrodes, thereby providing a plurality of fastened light valve arrays having substrates and electrooptic gates; and
 (d) separating the plurality of electrooptic gate arrays into individual arrays.

7. The method of claim 6, wherein said plates are releasably attached with a selective heat releasable adhesive.

8. A method of simultaneously making a plurality of light valve arrays each of which has a substrate, a plurality of transversely driven electrooptic gates secured to said substrate, and electrodes on a surface of the gates comprising the steps of:
 (a) cementing with a first adhesive that is dissolvable in a given solvent (i) a plurality of plates of electrooptic material and (ii) a plurality of plates of substrate material to form first and second stacks respectively;
 (b) cementing the first and second stacks with their respective plates aligned edge-to-edge with a second conductive adhesive that is not dissolvable in such solvent;
 (c) machining the aligned stacks to form a structure and metallizing a surface of the first stack to form electrodes; and
 (d) placing the structure in the given solvent which dissolves the first adhesive but not the second and thereby separates the structure into individual transversely driven light valve arrays.

* * * * *